United States Patent [19]

Morino et al.

[11] 4,013,153

[45] Mar. 22, 1977

[54] CLUTCH HUB FOR TRANSMISSION

[75] Inventors: Hideki Morino, Nagoya; Isao Tsuzuki, Kariya; Kenji Koshino, Toyota, all of Japan

[73] Assignee: Toyota Jidosha Kogyo Kabushiki Kaisha, Toyota, Japan

[22] Filed: Aug. 15, 1975

[21] Appl. No.: 605,118

[30] Foreign Application Priority Data

Sept. 6, 1974 Japan .......................... 49-103129
Sept. 6, 1974 Japan .......................... 49-103130

[52] U.S. Cl. .......................... 192/53 F; 192/53 G; 192/114 T
[51] Int. Cl.² .................. F16D 23/10; F16D 13/60
[58] Field of Search .......... 192/53 F, 53 G, 114 R, 192/114 T

[56] References Cited

UNITED STATES PATENTS

| | | | |
|---|---|---|---|
| 2,070,140 | 2/1937 | Peterson et al. | 192/114 T |
| 3,043,414 | 7/1962 | Peras | 192/114 T |
| 3,219,164 | 11/1965 | Henyon | 192/114 T |
| 3,620,338 | 11/1971 | Tomita | 192/53 F |

*Primary Examiner*—Allan D. Herrmann
*Attorney, Agent, or Firm*—Pollock, Vande Sande & Priddy

[57] ABSTRACT

A clutch hub comprising a pair of annular cylindrical elements joined together at their respective end walls, each element being made by press forming from a metal sheet blank and having splines on the outer and inner peripheral faces. The clutch hub of the above construction is effective in preventing accidental gear self-disengagement in a transmission and can be fabricated at a reduced cost.

8 Claims, 11 Drawing Figures

CLUTCH HUB FOR TRANSMISSION

BACKGROUND OF THE INVENTION

This invention relates to clutch hubs for use in transmissions of automotive vehicles, and more particularly to a clutch hub suitable for use in transmissions of the synchromesh type or constant mesh type.

Synchromesh transmissions are widely used in modern automotive vehicles. The transmission of this type is provided with a synchronizing mechanism which facilitates engagement of a slidable sleeve rotating coaxially on and with a shaft to be meshed with a gear of another speed in response to manipulation of the change lever. This synchronizing mechanism acts to bring the sleeve toward the gear so that the force of friction produced therebetween can be utilized to make the circumferential speed of the sleeve equal to that of the gear for facilitating the meshing engagement between the two gears. In a Borg-Warner type synchromesh transmission, for example, this synchronizing mechanism is composed of a splined clutch hub adapted for unitary rotation with an output shaft, a synchronizer ring mounted loosely on a conical portion of a driven gear, and spline hub sleeve for the purpose of engaging with gear splines, synchronizer ring and clutch hub. The clutch hub used in the transmission of this type has heretofore been manufactured by forging, sintering or the like due to the complex structure thereof. However, the manufacture of the clutch hub by the process above described has required a great number of manufacturing steps in addition to high material costs. Thus, the clutch hub manufactured by the prior art process has been quite expensive.

Further, the synchromesh transmission of the construction above described has not been satisfactorily reliable from the viewpoint of safety in that accidental self-disengagement of the hub sleeve from the gear splines tends to occur while the vehicle is running. In an effort to prevent occurrence of such an accidental gear self-disengagement, various clutch hubs and hub sleeves having splines provided with complex chamfered faces or circumferential groove have been proposed hitherto. However, these clutch hubs and hub sleeves have also been defective in that a complicated working process is required in addition to the difficulty of manufacture.

SUMMARY OF THE INVENTION

It is an object of the present invention to provide a novel and improved clutch hub which obviates the defects of prior art clutch hubs used in transmissions of the above type and which is light in weight and inexpensive.

Another object of the present invention is to provide a clutch hub which can prevent accidental gear self-disengagement and which is inexpensive and can be manufactured at low costs.

The clutch hub according to the present invention is composed of a pair of annular cylindrical elements firmly joined and aligned axially with each other at their respective end walls. The annular cylindrical element is obtained from a metal sheet blank by press forming. Each of these elements has an end wall at one end thereof and a plurality of splines extending in the axial direction throughout the inner peripheral face and outer peripheral face thereof, and these splines are formed on the inner and outer peripheral faces of each element in the course of press forming the sheet of metal into the annular cylindrical shape.

In a clutch hub disclosed in a first embodiment of the present invention, the outer diameter at the outer peripheral face of each of a pair of annular cylindrical elements (that is, the diameter measured at the radially outer end face of outer splines formed on the outer peripheral face of each element) is constant throughout the axial length of the element. This clutch hub is obtained by firmly joining these two elements each other at their respective end walls in such a relation that each of the outer splines on the outer peripheral face of one of the elements aligns on a straight line with the corresponding one of the outer splines on the outer peripheral face of the other element. Thus, in the clutch hub obtained in the manner above described, anyone of the outer splines on the outer peripheral face of the clutch hub extends rectilinearly in the axial direction from one end toward the other end of the clutch hub, and the width of each of these outer splines is constant throughout the axial length of the clutch hub.

A clutch hub disclosed in a second embodiment of the present invention is provided with outer and inner splines on the outer and inner peripheral faces respectively and is in general external appearance analogous substantially to a barrel in which the outer diameter at the opposite ends is smaller than that at the center of the overall length thereof. This clutch hub is obtained in a manner as described below. Each of a pair of annular cylindrical elements constituting the clutch hub is constructed in such a form that the outer diameter thereof (that is, the outer diameter at the radially outer end face of the outer splines on the outer peripheral face of the element) is smallest at one end and largest at the other end and has only one end wall at the largest diameter end. Therefore, each element assumes in general external appearance a frusto-conical shape having a slight axial taper. These two elements are firmly joined together at their large-diameter ends having an end wall. Thus, a clutch hub of substantially barrel-like shape can be obtained in which the outer diameter is largest at the center of the overall length thereof and smallest at the opposite ends. The outer splines formed on the outer peripheral face of each element have a constant width throughout the axial length of the element, and these two elements are firmly joined together at their respective end walls in such a relation that each of the outer splines of one of the elements aligns on a straight line with the corresponding one of the outer splines of the other element. This clutch hub of barrel-like external shape is effective in preventing the tendency of occurrence of accidental gear self-disengagement and has the advantage that the cost of manufacture is remarkably lower than that of prior art forged clutch hubs which are effective in preventing the tendency of occurrence of accidental gear self-disengagement.

A clutch hub disclosed in a third embodiment of the present invention is obtained by firmly joining a pair of annular cylindrical elements together at their respective end walls in such a relation that outer splines of one of the elements are slightly out of alignment with those of the other element. In the clutch hub obtained in this manner, the outer splines of the clutch hub are slightly staggered or offset at the center of the overall length of the clutch hub, and the outer splines of the two elements do not align on the same straight lines.

Thus, a force which is effective in preventing accidental gear self-disengagement is produced between the outer splines of the clutch hub and the gear splines of the driven gear or the splines of the hub sleeve when the outer splines of the clutch hub are engaged with the gear splines of the driven gear through the splines of the hub sleeve. The clutch hub of this type is also advantageous in that the cost of manufacture is remarkably lower than that of the prior art forged clutch hub which is effective in preventing accidental gear self-disengagement.

In a clutch hub disclosed in a fourth embodiment of the present invention, outer splines of one of a pair of annular cylindrical elements firmly joined together at their respective end walls do not align on straight lines with those of the other element, and the outer diameter of each element is uniformly decreased from one end having an end wall toward the other end having no end wall, so that the outer diameter of each element is largest at the joined end and smallest at the other end. The clutch hub of such a structure has a greater ability to prevent accidental gear self-disengagement than those of the clutch hubs disclosed in the first, second and third embodiments.

DETAILED DESCRIPTION OF THE PREFERRED EMBODIMENTS

Figure 1:
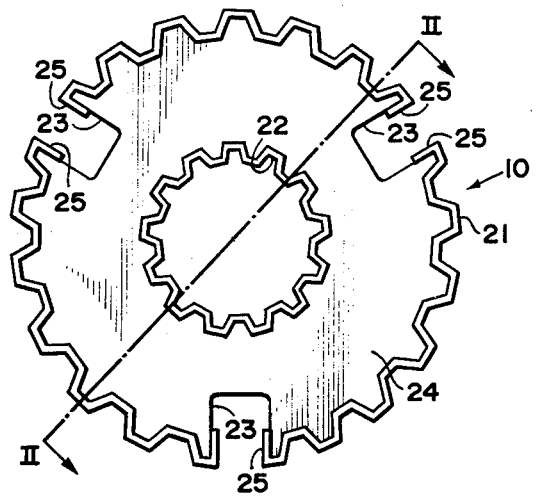
FIG. 1 is a front elevational view of a first embodiment of the clutch hub according to the present invention.
Figure 2:
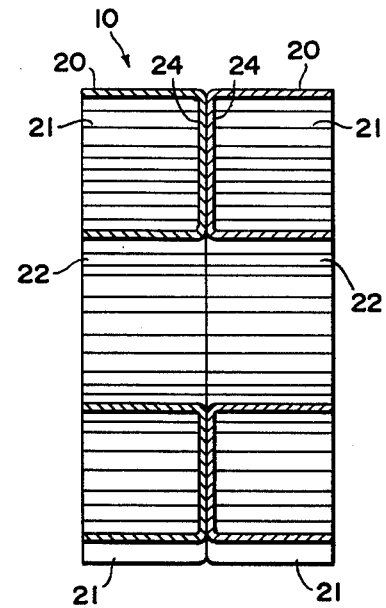
FIG. 2 is an axial sectional view taken on the line II—II in FIG. 1.

Referring to FIGS. 1 and 2 showing a first embodiment of the present invention, a clutch hub designated generally by the reference numeral 10 is obtained by firmly joining together endwise an annular cylindrical element 20 and another annular cylindrical element 20 forming a pair. (See FIG. 2) Various methods including welding and riveting may be employed for firmly joining these two elements 20 together. Each element has an end wall 24 at their one end and is provided with outer splines 21 extending axially on the outer peripheral face and inner splines 22 extending axially on the inner peripheral face. A plurality of equally circumferentially spaced key grooves 23 are further provided on the outer peripheral face and the end wall 24 of each element 20. Inwardly bent portions 25 of the outer splines 21 extending along the both sides of the key groove 23 are formed on the outer periphery of the element. The bent portion 25 is bent radially inwardly of the element and serve to engage with a key spring (later described).

Each element 20 is formed into the annular cylindrical shape by applying deep drawing to a metal sheet blank by press forming, and the outer splines 21 and inner splines 22 and end wall 24 are formed in this deep drawing process. (The width of these splines is constant throughout the axial length of each element 20.)

One pair of such annular cylindrical elements 20 having an end wall 24, which are formed generally into the annular cylindrical shape by the press forming and provided with the splines on the inner and outer peripheral faces thereof, are firmly joined together at their respective end walls 24, 24 as by welding. Consequently, a clutch hub having a structure as shown in FIGS. 1 and 2 is completed. In joining together the two elements 20 in the first embodiment of the present invention shown in FIG. 2, it is necessary to position these two elements 20 in such a relation that the outer and inner splines 21 and 22 provided on the outer and inner peripheral faces respectively of one of the elements 20 align on straight lines with the corresponding ones on the outer and inner peripheral faces respectively of the other element 20.

The clutch hub 10 thus obtained is mounted on an output shaft of a synchromesh transmission in such a state that the inner splines 22 thereof make spline engagement with the splines provided on the outer peripheral face of the output shaft.

The material cost of the clutch hub having a structure as above described is quite low compared with that of prior art clutch hubs due to the fact that it is formed from an inexpensive sheet metal blank. Further, the cost of manufacture of this clutch hub is remarkably low compared with that of prior art clutch hubs due to the fact that the elements constituting the same are formed into the shape by high-efficiency press working suitable for mass production. Furthermore, the clutch hub according to the present invention is light in weight and is thus advantageous in that the inertia mass is small and power losses in the transmission can also be reduced.

Figure 3:
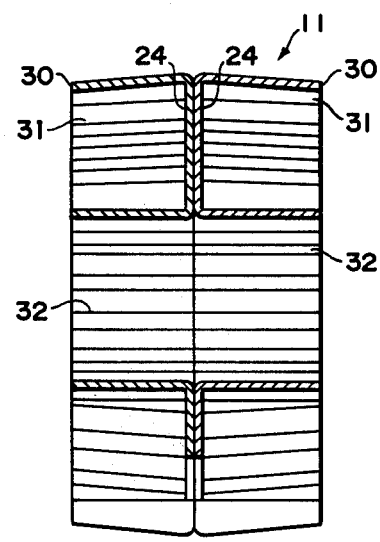
FIG. 3 is an axial sectional view of a second embodiment of the clutch hub according to the present invention.

In a second embodiment of the present invention shown in FIG. 3, the design of the clutch hub structure shown in FIG. 2 is partly modified to provide a clutch hub which is also effective in preventing accidental gear self-disengagement in a synchromesh transmission.

In the second embodiment shown in FIG. 3, clutch hub elements 30 of annular cylindrical shape are formed by applying deep drawing to a metal sheet blank as in the case of the elements 20 shown in FIGS. 1 and 2. In this second embodiment, however, the outer diameter at the open end of each element 30 is smaller than that at the end having an end wall. One pair of such elements 30 of frustoconical shape are firmly joined together at their large-diameter ends in abutting their respective end walls to obtain a clutch hub 11 as seen in FIG. 3. This clutch hub 11 is substantially in the form of a barrel form in general external appearance since the outer diameter at the radially outer end face of outer splines 31 of each element 30 is uniformly reduced from one end toward the other end. In this clutch hub 11 too, the width of the outer splines 31 is constant as in the clutch hub 10 shown in FIG. 2. The clutch hub 11 shown in FIG. 3 is featured by the fact that the radially outer end of the outer splines 31 is inclined relative to the axis of the clutch hub 11. Thus, when this clutch hub 11 is incorporated in a synchromesh transmission, a force tending to resist movement of a hub sleeve away from the position of spline engagement with gear splines is produced at the engaging portions between the outer splines 31 of the clutch hub 11 and the splines of the hub sleeve, as will be described later with reference to FIG. 8.

In the first and second embodiments of the present invention described hereinbefore, two elements which are entirely the same in size and shape are firmly joined together endwise to constitute a clutch hub. In these two embodiments, outer splines and inner splines of one of the elements align necessarily with the corresponding ones of the other element.

Figure 4:
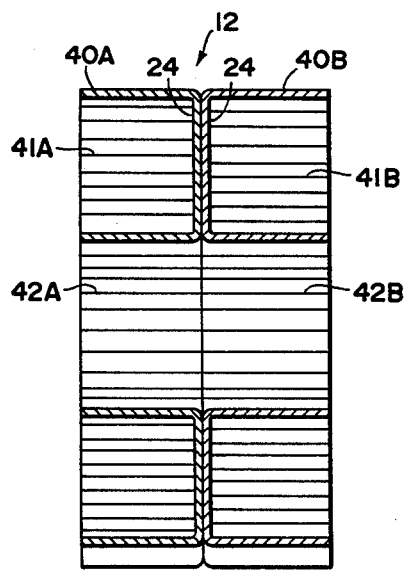
FIG. 4 is an axial sectional view of a third embodiment of the clutch hub according to the present invention.

In a third embodiment of the present invention shown in FIG. 4, a clutch hub 12 is composed of a pair of annular cylindrical elements 40A and 40B which are firmly joined together at their respective end walls in such a relation that outer splines 41A of the element 40A do not align with outer splines 41B of the element 40B. It is to be noted however that these outer splines 41A and 41B are out of axial alignment with each other when the two elements 40A and 40B are firmly joined together endwise in such a state that inner splines 42A of the element 40A align with inner splines 42B of the element 40B. In this clutch hub 12, a stagger or offset exists at the position at which the axial end face of each of the outer splines 41A of the element 40A is joined to the axial end face of the corresponding one of the outer splines 41B of the element 40B at the joint of these two elements 40a and 40B, and this stagger or offset serves to prevent accidental self-disengagement of a hub sleeve away from the position of spline engagement with gear splines in a synchromesh transmission.

Figure 5:
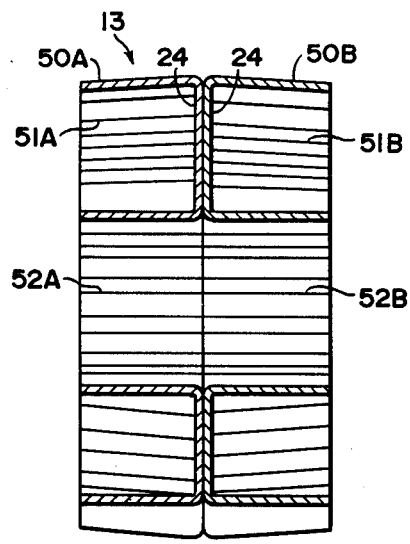
FIG. 5 is an axial sectional view of a fourth embodiment of the clutch hub according to the present invention.

In a fourth embodiment of the present invention shown in FIG. 5, a clutch hub 13 is composed of a pair of annular cylindrical elements 50A and 50B in each of which the outer diameter at the closed end is larger than that at the open end as in the second embodiment shown in FIG. 3. In this fourth embodiment, outer splines 51A and 51B of the respective elements 50A and 50B do not align with each other when the two elements 50A and 50B are firmly joined together at their respective endwalls. In this clutch hub 13, a stagger or offset exists at the joint between the outer splines 51A and 51B as in the third embodiment shown in FIG. 4.

Figure 6:
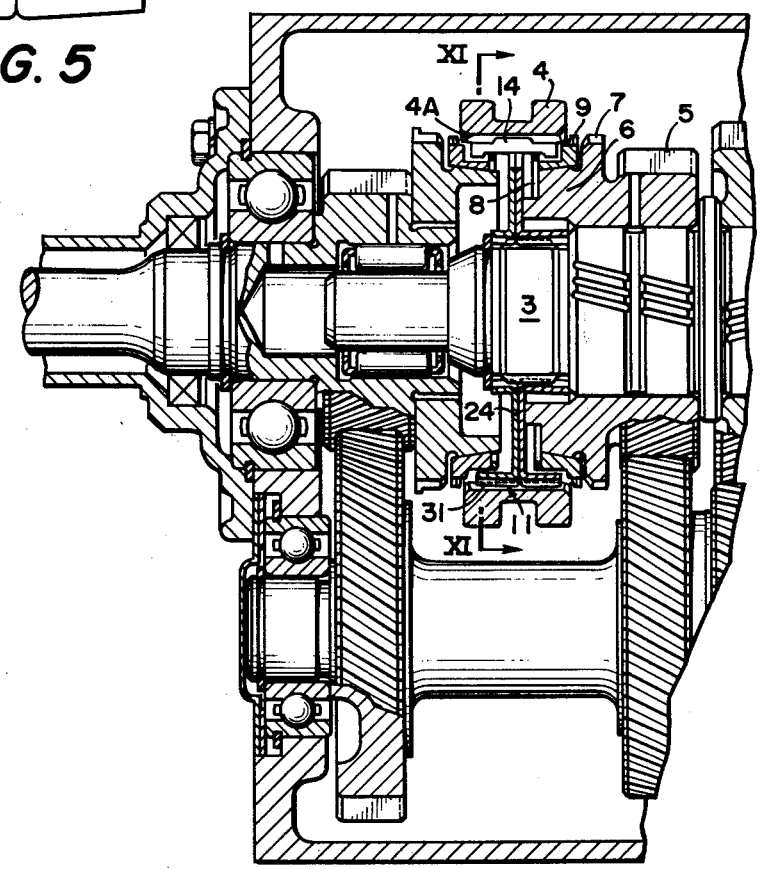
FIG. 6 is a longitudinal sectional view of parts of a synchromesh transmission of the Borg-Warner type equipped with one form of the clutch hub according to the present invention.

FIG. 6 shows a Borg-Warner type synchromesh transmission in which one of the clutch hubs shown in FIGS. 2 to 5, for example, the clutch hub 11 shown in FIG. 3 is incorporated. Referring to FIG. 6, the inner splines 32 of the clutch hub 11 are in spline engagement with outer splines of an output shaft 3. The outer splines 31 of the clutch hub 11 are engaged by inner splines 4A of a hub sleeve 4 which is slidable in the axial direction. A driven gear 5 is rotatably mounted on the output shaft 3 and is provided with gear splines 7 on a part of its conical portion 6. Further, a synchronizer ring 9 is loosely mounted on another part of the conical portion 6 of the driven gear 5. Shifting keys 14 are axially slidably received in the respective key grooves 23 (FIG. 1) of the clutch hub 11 and are pressed into corresponding grooves on the splined inner face of the hub sleeve 4 by the force of a key spring 8 mounted in the clutch hub 11.

In the transmission employing the clutch hub 11 according to the present invention, the manner of thrust transmission between the driven gear 5 and the clutch hub 11 differs from that in a transmission employing a clutch hub of prior art structure. More precisely, in the transmission shown in FIG. 6, thrust is transmitted through the end extension of the driven gear 5 and through the central end wall 24 between the elements 30 constituting the clutch hub 11, whereas in the transmission employing the prior art clutch hub structure, thrust is transmitted through the end face of the boss portion of the clutch hub and through the end face of the driven gear.

Figure 7:
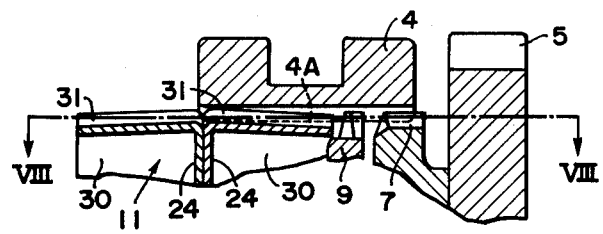
FIG. 7 is an enlarged sectional view of parts of the synchromesh transmission shown in FIG. 6 when the clutch hub shown in FIG. 3 is employed in such synchromesh transmission.

FIG. 7 is an enlarged sectional view of parts of the transmission shown in FIG. 6. It will be seen from FIG. 7 that the hub sleeve 4 engages with the clutch hub 11, synchronizer ring 9 and driven gear 5 for power transmission.

Figure 8:
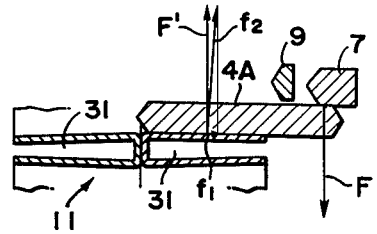
FIG. 8 is an enlarged partial view when viewed along the line VIII—VIII in FIG. 7 to illustrate how a force for preventing accidental gear self-disengagement is produced between the splines of the clutch hub and the splines of the hub sleeve.

The function of the clutch hub 11 shown in FIG. 3 will be described with reference to FIG. 8. As seen in FIG. 8, one of the splines 4A of the hub sleeve 4 is in engagement with the associated gear spline 7 at one of the side faces thereof and in engagement with the associated outer spline 31 of one of the elements 30 of the clutch hub 11 at the other side face thereof. A driving force F transmitted to the gear spline 7 of the driven gear 5 is transmitted to the hub sleeve spline 4A, while a reaction force F' appears at the contact portion between the hub sleeve spline 4A and the associated outer spline 31 of one of the elements 30 of the clutch hub 11. This reaction force F' is a component of a force $f_2$ perpendicular to the side face of the outer spline 31 of the clutch hub 11 and is imparted in a direction perpendicular to the axis of the clutch hub 11.

The outer diameter of the clutch hub 11 is smaller at the opposite ends than that at the center of the length as described previously, and therefore, the face of the outer spline 31 of the clutch hub 11 in contact with the hub sleeve spline 4A is inclined with respect to the axis of the clutch hub 11. Thus, a force as shown by the symbol $f_1$ in FIG. 8 is produced at the contact portion between the hub sleeve spline 4A and the outer spline 31 of the clutch hub 11, and this force $f_1$ serves to prevent accidental gear self-disengagement due to movement of the hub sleeve 4, hence the hub sleeve spline 4A away from the position of spline engagement with the gear spline 7. (The term "gear self-disengagement" is commonly used to indicate such a phenomenon that the hub sleeve 4 moves suddenly toward the left in FIG. 8 relative to the driven gear 5 and the hub sleeve splines 4A are disengaged from the spline engagement with the gear splines 7.) The force shown by the symbol $f_1$ in FIG. 8 is effective in resisting the tendency of accidental leftward movement of the hub sleeve 4, and therefore, occurrence of accidental gear self-disengagement in the transmission can be effectively prevented by the use of the clutch hub 11 having the structure shown in FIG. 3.

Figure 9:
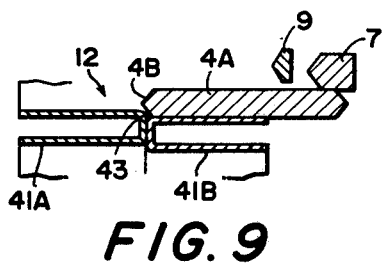
FIG. 9 is a view similar to FIG. 8 to illustrate how a force for preventing accidental gear self-disengagement is produced between the splines of the clutch hub and the splines of the hub sleeve when the clutch hub shown in FIG. 4 is employed in the synchromesh transmission shown in FIG. 6.

FIG. 9 is a view similar to FIG. 8 and illustrates the case in which the clutch hub 12 shown in FIG. 4 is incorporated in the transmission shown in FIG. 6. In the clutch hub 12 shown in FIG. 4, the outer splines 41A and 41B of the respective elements 40A and 40B do not align with each other at the joint between the elements 40A and 40B as described previously, and therefore, a stagger or offset designated by the reference numeral 43 in FIG. 9 exists at the center of the overall length of the outer splines 41A and 41B of the clutch hub 12. In FIG. 9, one of the hub sleeve splines 4A is shown engaging with the associated gear spline 7 and with the associated clutch hub spline 41B of the element 40B of the clutch hub 12. When the hub sleeve 4 starts to move suddenly toward the left in FIG. 9 and the hub sleeve spline 4A tends to be disengaged from the spline engagement with the associated gear spline 7, such movement of the hub sleeve spline 4A is prevented by the axial end face of the associated clutch hub spline 41A of the other element 40A, and as a result, accidental gear self-disengagement in the transmission can be effectively prevented. When the clutch hub 12 shown in FIG. 4 is used in the transmission shown in FIG. 6, a force resisting occurrence of accidental gear self-disengagement as shown in FIG. 8 does not appear at the contact portions between the clutch hub splines and the hub sleeve splines, and the leftward movement of the hub sleeve 4 is blocked solely by the offset 43 formed due to out of alignment of the clutch hub splines 41A and 41B in the circumferential direction of the clutch hub 12. In this case, the leftward movement of the hub sleeve 4 is blocked by abutment of the chamfered end face portion 4B of each of the hub sleeve splines 4A with the associated offset 43. Further, due to the fact that the axial end faces of the clutch hub splines 41A and 41B providing the offset 43 at the joint therebetween are rounded in the course of press working, resistance is not encountered during the movement of the hub sleeve 4 in a gear shift operation.

Figure 10:
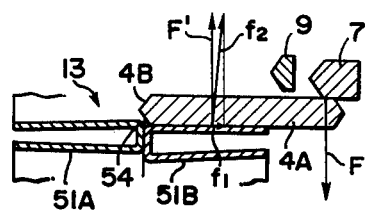
FIG. 10 is a view similar to FIG. 8 to illustrate how a force for preventing accidental gear disengagement is produced between the splines of the clutch hub and the splines of the hub sleeve when the clutch hub shown in FIG. 5 is employed in the synchromesh transmission shown in FIG. 6.

FIG. 10 is a view similar to FIG. 8 and illustrates the case in which the clutch hub 13 shown in FIG. 5 is incorporated in the transmission shown in FIG. 6. As described already with reference to FIG. 5, the clutch hub 13 shown in FIG. 10 has its outer diameter uniformly reduced from the center toward the opposite ends thereof and is formed with the outer splines 51A and 51B providing an offset 54 at the joint therebetween. In FIG. 10, one of the hub sleeve splines 4A is shown engaging with the associated clutch hub spline 51B and with the associated gear spline 7. Even when the hub sleeve 4 is moved suddenly toward the left in FIG. 10 and the hub sleeve spline 4A tends to be disengaged from the spline engagement with the associated gear spline 7, such movement of the hub sleeve 4 is prevented by the combination of a force $f_1$ acting upon the face of the hub sleeve spline 4A and the offset 54 formed at the joint between the clutch hub splines 51A and 51B, and as a result, accidental gear self-disengagement in the transmission can be positively prevented. (In FIGS. 8, 9 and 10, the same reference numerals are used to designate the same parts, and therefore, the forces $f_2$, F′ and F are not especially explained in FIGS. 9 and 10.)

It will be understood from the foregoing description that the clutch hub structures shown in FIGS. 3 to 5 have the advantage of effectively and reliably preventing accidental gear self-disengagement in a transmission in addition to the advantage of the clutch hub structure shown in FIG. 2 which is light in weight and inexpensive.

The clutch hub according to the present invention has the following additional advantage suitable for incorporation in a Borg-Warner type synchromesh transmission.

Figure 11:
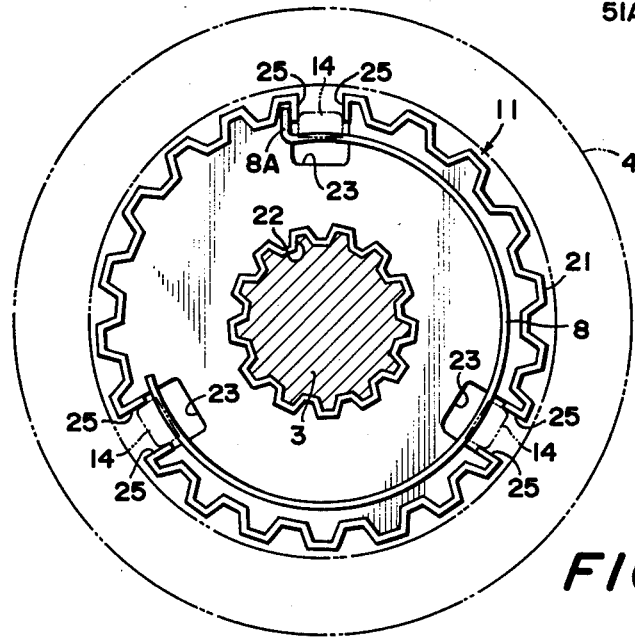
FIG. 11 is a front elevational view of one form of the clutch hub having a key spring mounted therein.

FIG. 11 is a partial view showing the state in which the clutch hub 11 embodying one form of the present invention is incorporated in a Borg-Warner type synchromesh transmission of construction as shown in FIG. 6. Referring to FIG. 11, the reference numeral 4 designates the hub sleeve shown in FIG. 6, and the reference numeral 14 designates a plurality of shifting keys which are pressed against the inner peripheral face of the hub sleeve 4. These shifting keys 14 are received in the individual grooves 23 formed on the outer periphery and an end wall of the clutch hub 11 of the present invention and are pressed against the inner peripheral face of the hub sleeve 4 by a key spring 8 of arcuate shape. (The same reference numerals are used in FIG. 11 to denote the same parts appearing in FIGS. 1 and 6.)

The key spring 8 acts to normally bias the three shifting keys 14 radially outward relative to the axis of the output shaft 3 so as to press these shifting keys 14 against the inner peripheral face of the hub sleeve 4, and the key spring 8 itself is held by its own resiliency in the position bearing against the three shifting keys 14. The key spring 8 is formed at one end thereof with a hook portion 8A to be engaged with radially inwardly bent portion 25 of one of the outer splines 21 of the clutch hub 11 so as to lock the key spring 8 against movement in the circumferential direction of the clutch hub 11.

Clutch hubs of prior art structure have been generally formed into the shape by forging unlike the clutch hub of the present invention, and it has therefore been necessary to form such a hook portion of each end of the key spring. In contradistinction to such prior art clutch hub, the clutch hub of the present invention is formed into the shape by press working from a metal sheet blank. Thus, it is merely required to provide a single hook portion at only one end of the key spring for securely fixing the key spring in position in the clutch hub, and consequently, the structure of the key spring is quite simple compared with that of the prior art one.

We claim:
1. A transmission comprising,
   an output shaft,
   a driven gear mounted on said output shaft for rotation relative to said shaft, said driven gear having meshing splines on its outer peripheral face,
   a clutch hub having splines on the outer periphery thereof and fitted on said output shaft,
   and a hub sleeve axially slidable relative to said output shaft and having splines engageable with said clutch hub splines provided on the outer periphery of said clutch hub and also with said gear splines of said driven gear, said clutch hub comprising a pair of annular cylindrical elements each having an end-wall at an end thereof, said end walls being firmly joined and aligned axially with each other, each said element being press-formed from a metal sheet blank and being provided with, in addition to said splines on its outer peripheral face, splines on the inner peripheral face thereof.

2. The combination of claim 1, wherein said pair of said elements are firmly joined together at their respective end walls in such a relation that the outer splines of one of said elements align on straight lines with the corresponding ones of the other said element.

3. The combination of claim 1, wherein said pair of said elements are firmly joined together at the respective end walls in such a relation that the outer splines of one of said elements are staggered on straight lines with the corresponding one of the other said element.

4. The combination of claim 1, wherein the outer diameter of each said element is uniformly reduced from one end having an endwall toward the other end having no endwall of said element.

5. The combination of claim 4, wherein said pair of said elements are firmly joined together at the respective end walls in such a relation that the outer splines of one of said elements align on straight lines with the corresponding ones of the other said element.

6. The combination of claim 4, wherein said pair of said elements are firmly joined together at their respective end walls in such a relation that the outer splines of one of said elements are staggered with the corresponding ones of the other said element.

7. The combination of claim 1, wherein a plurality of circumferentially spaced key grooves for receiving shifting keys is formed at the outer peripheral face of each said element.

8. The combination of claim 7, wherein radially inwardly bent portions are formed at the outer splines extending along the key grooves, and means including a key spring engaging with said radially inwardly bent portions.

* * * * *